United States Patent
Capano et al.

(10) Patent No.: US 7,075,425 B2
(45) Date of Patent: Jul. 11, 2006

(54) APPARATUS AND METHOD FOR MONITORING SEWER SYSTEM OPERATION

(75) Inventors: David Capano, Greenfield, NY (US);
Clark A. Henry, Scotia, NY (US);
William J. Antalek, Latham, NY (US);
Elwood L. Morrell, Jr., Altamont, NY (US); John H. Koegler, Jr.,
Pattersonville, NY (US); Sharon G. Salvi, Stillwater, NY (US)

(73) Assignee: Environment One Corporation, Niskayuna, NY (US)

( * ) Notice: Subject to any disclaimer, the term of this patent is extended or adjusted under 35 U.S.C. 154(b) by 418 days.

(21) Appl. No.: 09/977,067

(22) Filed: Oct. 12, 2001

(65) Prior Publication Data

US 2002/0109592 A1    Aug. 15, 2002

Related U.S. Application Data

(60) Provisional application No. 60/240,568, filed on Oct. 13, 2000.

(51) Int. Cl.
*G08B 1/00*    (2006.01)
(52) U.S. Cl. ............... 340/531; 340/607; 340/614; 340/626
(58) Field of Classification Search ........... 340/571, 340/603, 606, 607, 608, 611, 612, 614, 617, 340/626
See application file for complete search history.

(56) References Cited

U.S. PATENT DOCUMENTS

| | | | | |
|---|---|---|---|---|
| 3,605,799 | A * | 9/1971 | Cherne | 137/413 |
| 3,775,026 | A * | 11/1973 | Hewlings | 417/36 |
| 4,740,963 | A * | 4/1988 | Eckley | 370/522 |
| 5,327,488 | A * | 7/1994 | Garland | 379/215.01 |
| 5,400,246 | A * | 3/1995 | Wilson et al. | 340/3.1 X |
| 5,503,533 | A * | 4/1996 | Potter et al. | 417/63 |
| 5,917,405 | A * | 6/1999 | Joao | 340/426 |
| 6,261,446 | B1 * | 7/2001 | Cornick | 210/173 |
| 6,278,357 | B1 * | 8/2001 | Croushore et al. | 375/259 |
| 6,366,647 | B1 * | 4/2002 | Webb | 379/40 |
| 6,377,171 | B1 * | 4/2002 | Fewel | 340/522 |
| 6,378,554 | B1 * | 4/2002 | Struthers | 137/565.29 |

* cited by examiner

*Primary Examiner*—Daryl C. Pope
(74) *Attorney, Agent, or Firm*—Heslin Rothenberg Farley & Mesiti P.C.

(57) ABSTRACT

Disclosed are methods and apparatus for monitoring a plurality of grinder pumps, and in particular, remotely over a communications network. Aspects of the invention include an alarm panel having a modular configuration, a modem board which allows use of a single telephone line and use by the homeowner in an emergency, the transmission of data over a high voltage AC line, and recharging of a sensing tube for measuring the level of wastewater in a tank.

14 Claims, 10 Drawing Sheets

ALARM DETAILS

SITE NAME: 1414 BEACH ROAD

Pre STAT Display

CHECK PUMP
○ VOLTAGE
○ CURRENT
○ EXTENDED RUN TIME

SERVICE REQUIRED
○ HIGH LEVEL ALARM
○ SENSOR
○ COMMUNICATION
○ BATTERY

TIME OF ALARM: 6/20/00 @ 11:00 AM

ALARM DESCRIPTION: EXTENDED RUN TIME

ALARM DESCRIPTION: 17 MINUTES

[REPAIR COMPLETE]  [PRINT SCREEN]  [CLOSE]

---

⊟ GROVE STREET
  ⋯ 110 GROVE STREET
  ⊟ 111 GROVE STREET
        PUMP 1
        PUMP 2
  ⋯ 112 GROVE STREET
  ⋯ 113 GROVE STREET
  ⋯ 114 GROVE STREET
  ⋯ 115 GROVE STREET
⊟ PINE STREET
  ⊞ 12 PINE STREET
  ⋯ 14 PINE STREET
  ⋯ 16 PINE STREET
  ⋯ 18 PINE STREET
⊟ 1402 BEACH ROAD

APPARATUS AND METHOD FOR MONITORING SEWER SYSTEM OPERATION

RELATED APPLICATION

This application claims the benefit of U.S. Provisional Application No. 60/240,568, filed Oct. 13, 2000, entitled "Apparatus And Method For Monitoring Sewer System Operation," which is hereby incorporated herein by reference in its entirety.

TECHNICAL FIELD

This invention relates generally to sewer systems. More particularly the present invention relates to methods and apparatus for monitoring sewer system operation.

BACKGROUND OF THE INVENTION

Grinder pumps are often used in low pressure sewage systems for pumping sewage and include a grinder mechanism for cutting or grinding solids or semisolid matter in the material being pumped. Grinding solids and/or semisolid matter in the sewage allows the resulting particulate effluent to be transferred using a pump through small diameter pipes without clogging.

Typically for residential use, a grinder pump is part of a stand along unit or station and includes a water level sensor connected to an alarm panel for monitoring the water level. The alarm panel typically includes an audible alarm and/or visual alarm such as lights for indicating a high water condition.

There is a need for further methods and apparatus for monitoring operation of sewer systems.

SUMMARY OF THE INVENTION

The above need is met by the present invention which in one aspect includes a method for remotely monitoring a plurality of grinder pump stations at a plurality of different first locations. The method includes obtaining data regarding operation of the plurality of grinder pump stations at the first locations, and transferring the data from the first locations via a communications network to a central computing unit at a second location different from the first locations.

Another aspect of the present invention includes an alarm panel for a grinder pump station. The alarm panel in includes a processor for monitoring the grinder pump, and a modem board connectable to the processor. At least one of the processor and the modem board includes an override to allow use of a telephone by a homeowner over use of the telephone line during transmission of data to a central computing unit.

Another aspect of the present invention includes a modular alarm panel for a grinder pump station. The modular alarm panel includes a processor for monitoring the grinder pump, and wherein the processor is connectable to a power loss high level alarm module, a modem board, a pressure transducer, and a generator receptacle.

Another aspect of the present invention includes a method for recharging a sensing tube for use in measuring a level of a fluid in a receptacle. The method includes permitting the level of the fluid in the receptacle to go below the bottom of the sensing tube.

Another aspect of the present invention includes a method for transmitting information over a high voltage alternating current line. The method includes receiving data at a first location, modulating the voltage of an alternating current line at the first location to generate a series of pulses corresponding to the information, detecting the series of pulses in the high voltage line at a second location different from the first location, and determining the data at a second location based on the series of pulses.

BRIEF DESCRIPTION OF THE DRAWINGS

The subject matter which is regarded as the invention is particularly pointed out and distinctly claimed in the concluding portion of the specification. The invention, however, may best be understood by reference to the following detailed description of the following embodiments and the accompanying drawings in which:

FIG. 8 is a screen display of a computing unit illustrating an extended run time alarm of a grinder pump station;

FIG. 9 is a screen display of a computing unit illustrating monthly operating parameters of a grinder pump station;

DETAILED DESCRIPTION OF THE INVENTION

Figure 1:
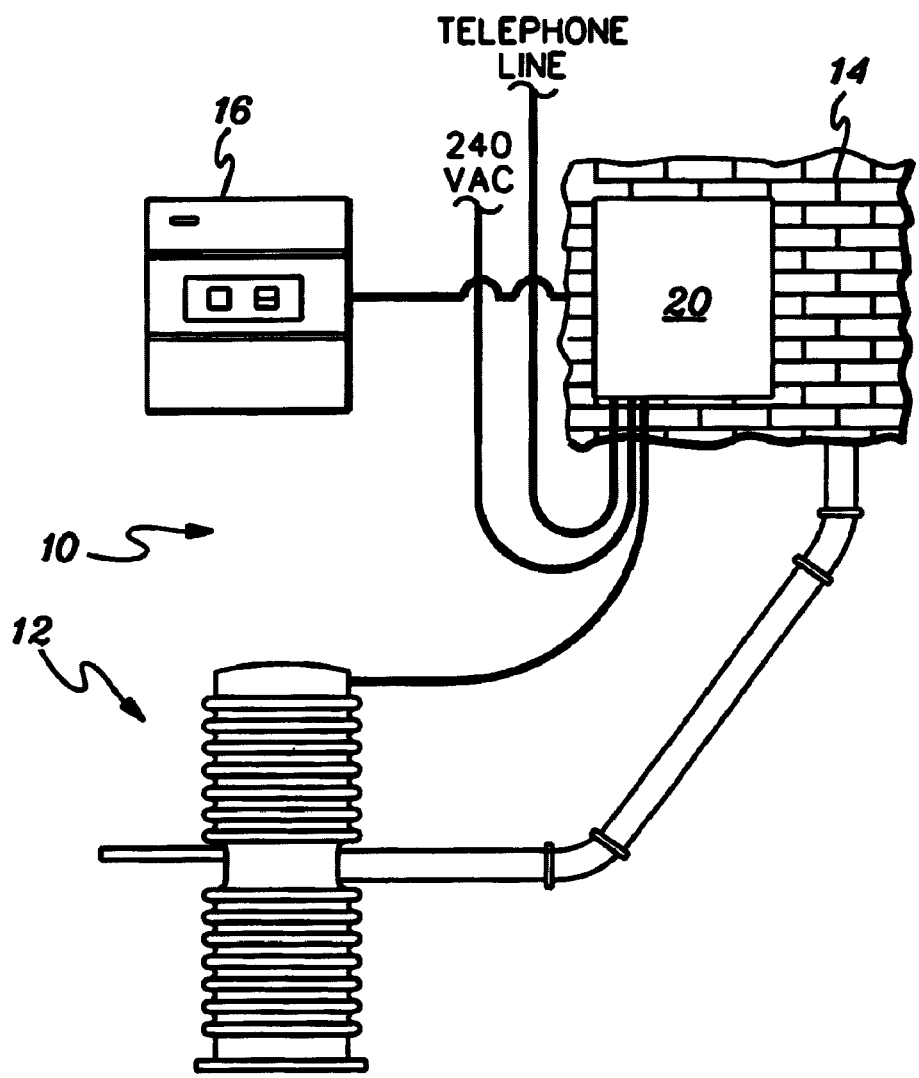
FIG. 1 is a diagrammatic illustration of one embodiment of a grinder pump system in accordance with the present invention.

FIG. 1 illustrates one configuration of a grinder pump system 10 in accordance with the present invention. In this configuration, grinder pump system 10 generally includes a grinder pump station 12 for receiving wastewater from, for example, a residential home 14, and an alarm panel 20 operably connected to grinder pump station 12, a 240 VAC electrical power source, a telephone line, and an in-home power loss high level alarm 16.

As described in greater detail below, alarm panel 20 periodically and/or continuously monitors operation of the grinder pump station, e.g., compares changes in the operating parameters over time and/or compares the operating parameter against predetermined criteria, to determine an alarm condition and/or warn of potential service requirements in advance of failure. The visual and audible alarms are also intermittently or continuously energized based on the severity of specification condition of the grinder pump system. The warning may be provided either on-site and/or at a remote location, e.g., transmitted over a communications network which allows remotely monitoring a plurality of grinder pump systems. This technique provides faster response time for repair and reduces maintenance costs by allowing repair prior to the occurrence of increased or major problems or a breakdown of the grinder pump system or a component thereof.

Figure 2:
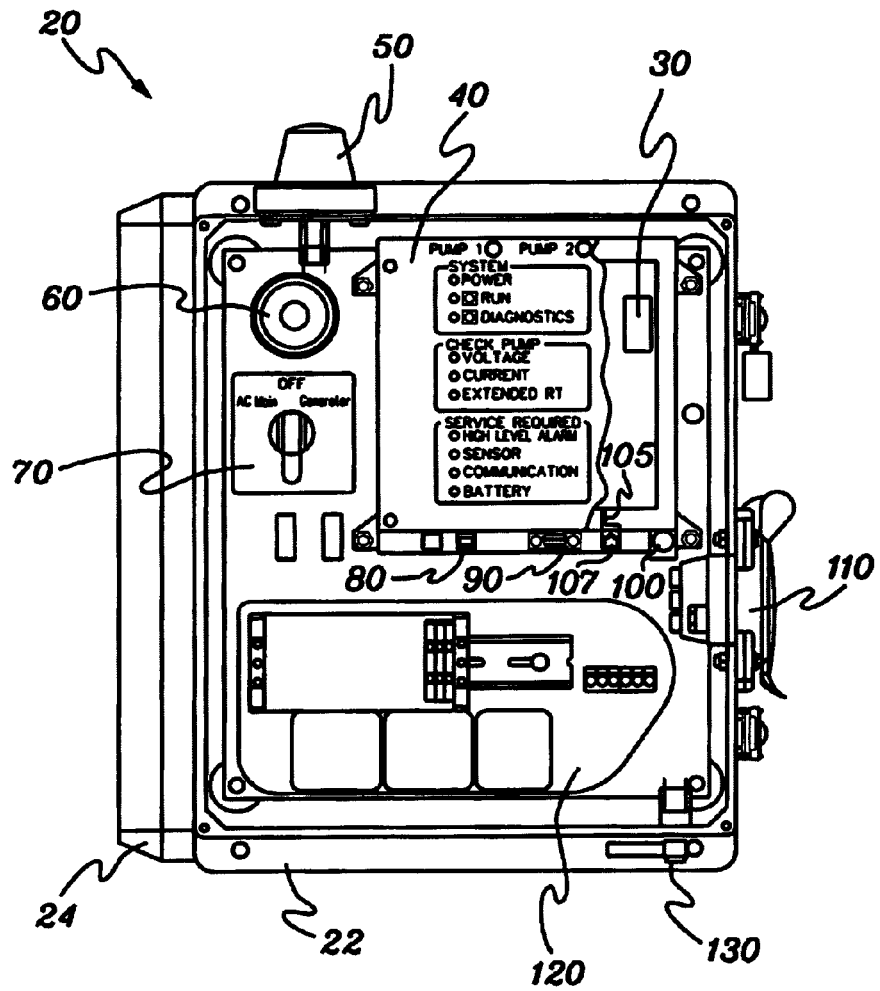
FIG. 2 is an enlarged elevational view of the alarm panel of the grinder pump system of FIG. 1.

As shown in FIG. 2, alarm panel 20 generally includes a processor 30, a display panel 40, a visual alarm indicator 50, and an audible alarm 60, a manual transfer switch 70 for switching between an AC main and a portable generator, an RS-485 serial communications port 80, an RS-232 serial communications port 90, a handheld programmer port 100, a modem board 105 and a telephone port 107, a generator receptacle 110, an interface terminal strip 120, and an alarm silence switch 130. Alarm panel 20 includes an enclosure or housing 22 which may be formed from a fiber glass material and includes a pad-lockable hinged cover 24.

Figure 3:
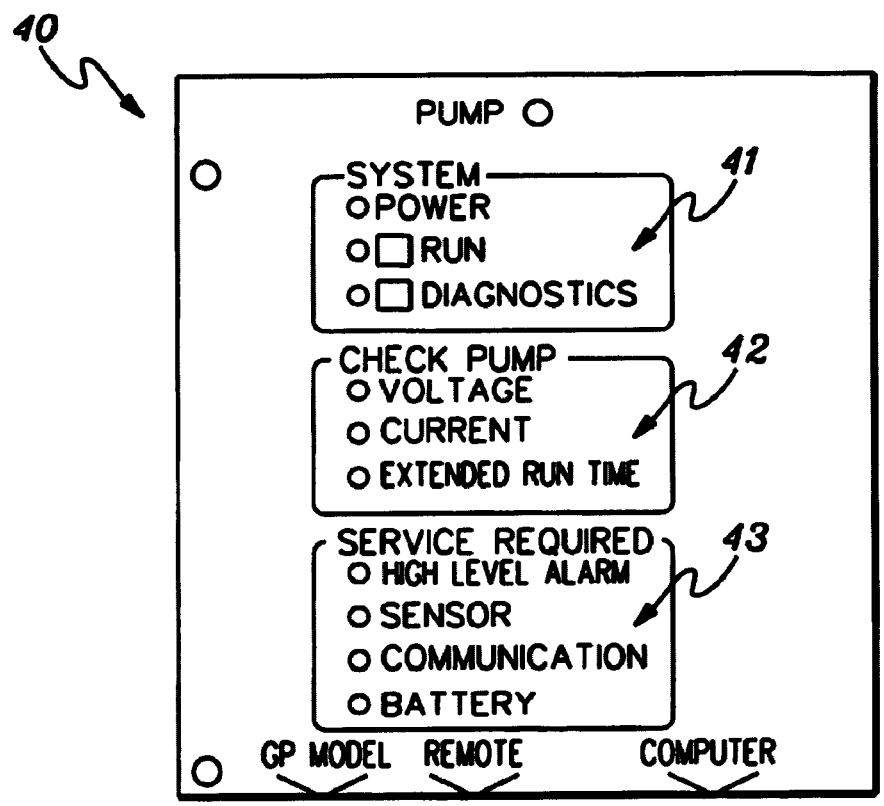
FIG. 3 is an enlarged view of the display panel of the alarm panel of FIG. 2.

As best shown in FIG. 3, display panel 40 includes system indicators 41 which include LED's for indicating power, run, and diagnostics, and switches for initiating manual pump operation and running a diagnostic check, check pump indicators 42 comprising LED's for indicating an occurrence regarding an alarm condition or service warning in connection with the voltage, the current, and the occurrence of an extended run time, and service required indicators 43 comprising LED's for indicating anomalies regarding the high (water) level, a sensor (part of pressure transducer assembly described below), a communication link (between processor and modem board), and the back-up battery.

With reference again to FIGS. 1 and 2, system 10, grinder pump station 12, and/or alarm panel 20 may include modular components allowing the system to be customized based on the user's requirements. For example, the modular components may include power loss high level alarm 16, manual transfer switch 70 and generator receptacle 110, modem board 105 and telephone port 107, and a pressure transducer assembly (not shown in FIG. 2). From the present description it will be appreciated that various other modules may be connectable to the processor. The modularity allows configuring the system to the customer's needs, e.g., providing a less expensive stand alone system only having the power loss high level alarm to a more expensive system, for example, including several or all of the modular components.

Power loss high level alarm 16 connects to alarm panel 20 and is designed to be installed in a high traffic area of the residential home. Visual and audible alarm indications are activated if the main electrical power is lost to the grinder pump or the water level inside the tank is at or above a "high" water level. A power loss sensor may include a relay and the high level sensor may include an electrical sensor. Power loss high level alarm 16 is desirably powered by a battery. In addition, the alarm 16 may provide an alarm for indicating service or maintenance required similar to the alarm panel.

The manual transfer switch 70 may include a circuit breaker and generator receptacle 110 may include a 30-amp 250 VAC receptacle to provide means for operating the grinder pump system via a portable generator. If the AC power main to the alarm panel is lost, the manual transfer switch may be rotated from the "AC mains" position to the "Generator" position. A portable generator may be plugged into receptacle 110 located on the outside of the housing 22. The receptacle may be protected from the weather via a spring loaded gasket cover.

The modem board 105 may be connectable to processor 30 to receive a telephone call from a central computing unit (FIGS. 5 and 6) and to call the central computing unit upon the occurrence of an alarm condition or service warning(s) or periodically to download stored data regarding the operation of the grinder pump station. As described below, various operating parameters and service requirements may be retrieved from or automatically forwarded to the central computing unit.

Modem board 105 and/or processor 30 may be configured to allow use of the homeowner's existing telephone line and include an override or "barge-in" capability. For example, if the telephone line is being used by the alarm panel and the homeowner picks up the telephone receiver, any transmission to the service center is stopped and the homeowner may use the telephone. The transmission from the alarm panel to the central computing unit will then be repeated at a later time when the homeowner is not using the telephone. Also, if the homeowner is using the telephone, the alarm panel will not interrupt the call during periodic downloads to the service center, but instead wait for an open line. The transmission of information from the alarm panel to the service center allows the homeowner to place a telephone call in an emergency, and also eliminates the need for the homeowner to provide a second telephone line to implement the remote monitoring capabilities of the system.

Figure 4:
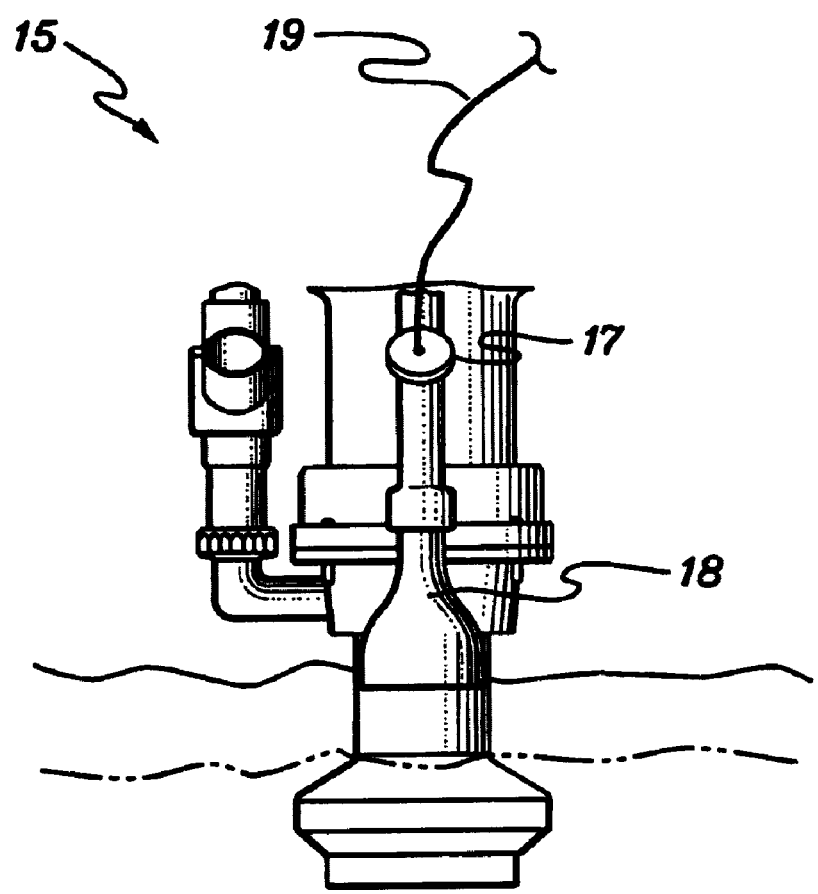
FIG. 4 is an enlarged side elevational view of the grinder pump of FIG. 1.

FIG. 4 is an enlarged view of a grinder pump 15 of the grinder pump station shown in FIG. 1. The grinder pump employs one or more sensing tubes 18 to sense pressure variations by measuring increases in the level of sewage collected in grinder pump station 10. Upon the attainment of a predetermined sewage level, the motor will be energized. The sewage collected in the grinder pump station will then be ground by a grinder head and thereafter pumped by grinder pump from the discharge housing to a discharge outlet pipe.

For example, illustrated grinder pump 15 may include a pressure transducer 17 connectable to a sensing tube 18 and connectable to processor 30 (FIG. 2) via a wire 19. Pressure transducer 17 provides a continuous monitoring of the fluid, for example, wastewater in the grinder pump tank. Continuous level sensing enables the "pump on" and the "pump off" levels to be varied, e.g., programmed adjustments, so that grease is less likely to accumulate inside the grinder pump tank. Changing the on/off levels results in a redistribution of the grease, making it more uniform over a greater range, instead of allowing a build up over a narrower range.

Processor 30 or a separate pressure transducer printed circuit board connectable to processor 30 may also allow the pump to remain on so that the bottom of the sensing tube is exposed to atmospheric pressure. This may be preformed, e.g., every 128 cycles, to allow recharging the air column inside the sensing tubes. By recharging the air column in the sensing tubes, air temperature or thermal factors which can affect the accuracy of the reading of the level of the fluid in the tank may be reduced or factored out. A moisture sensor may also be provided inside the control compartment of the grinder pump to monitor for the accumulation of moisture or water. In addition, the alarm panel may be operable for use with a single grinder pump or a two grinder pump configuration.

Processor 30 may be provided or operable using suitable software for monitoring and predicting failure of the grinder pump station which may include obtaining and monitoring data regarding the following:

a) monthly accumulation of:
    pump cycles (min., max, average per day)

run time (min., max, average per day)

flow rate (min., max, average per day)

supply voltage (min., max, average per day)

current draw (min., max, average per day)

b) detection of when the power source voltage is moderately low or high (e.g., +/−10 volts), and when power source voltage continuously remains above or below a certain voltage level.

c) detection of when the pump motor current is moderately low or high, and when pump motor current continuously remains above or below a certain voltage level.

d) detection of when "run time" (time for grinder pump to remove waste water from grinder pump tank) is moderately long, and when "run time" is greater than predetermined amount of time (grinder pump runs too long).

e) detection of high level alarm (when wastewater reaches predetermined level).

f) detection (e.g., check every two seconds) whether communication with water level sensor (e.g., continuous pressure transducer) is lost (e.g., water in control cavity, break in cable, failure of transmission circuit).

g) detection (e.g., check every two seconds) whether communication between logic board and modem board is lost.

h) detection of low battery backup power.

Figure 5:
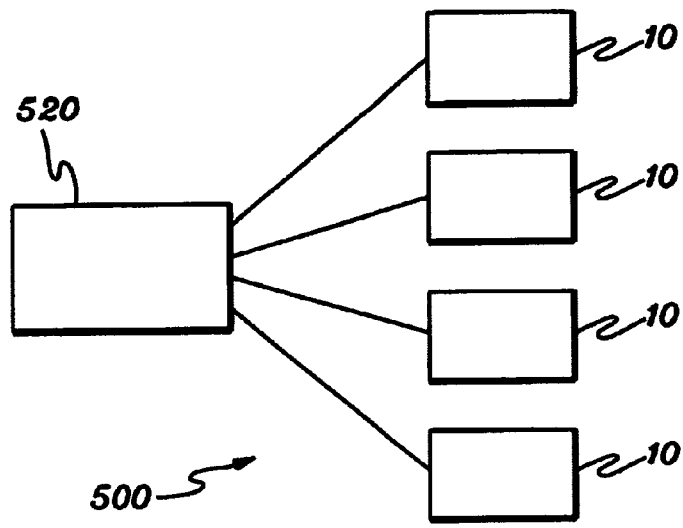
FIG. 5 is a block diagram of a plurality of grinder pump systems connected via telephone lines to a central computing unit.

FIG. 5 is a schematic illustration of one embodiment of a networked system 500 which may be maintained by or on behalf of a service provider such as a local sewage department for automatically or manually monitoring a plurality of grinder pump systems 10 at a central location. For example, each of the plurality of grinder pump systems can be connected to the central computing unit 520 via telephone lines and initiate communication between the alarm panel and the central computing unit, e.g., upon an alarm abnormal condition, or transferring or downloading various accumulated information to the central computing unit. Alternatively, the central computing unit can access (for downloading stored operating data) each grinder pump systems by calling the grinder pump system. For example, each grinder pump station can be provided with a unique telephone number. The alarm panel can be connected to a telephone line and accessed by use of the resident's home telephone number. The system provides faster response time for repair and reduced maintenance costs, e.g., by allowing repair prior to the occurrence of increased or major problems or a breakdown of the system or a component thereof.

Figure 6:
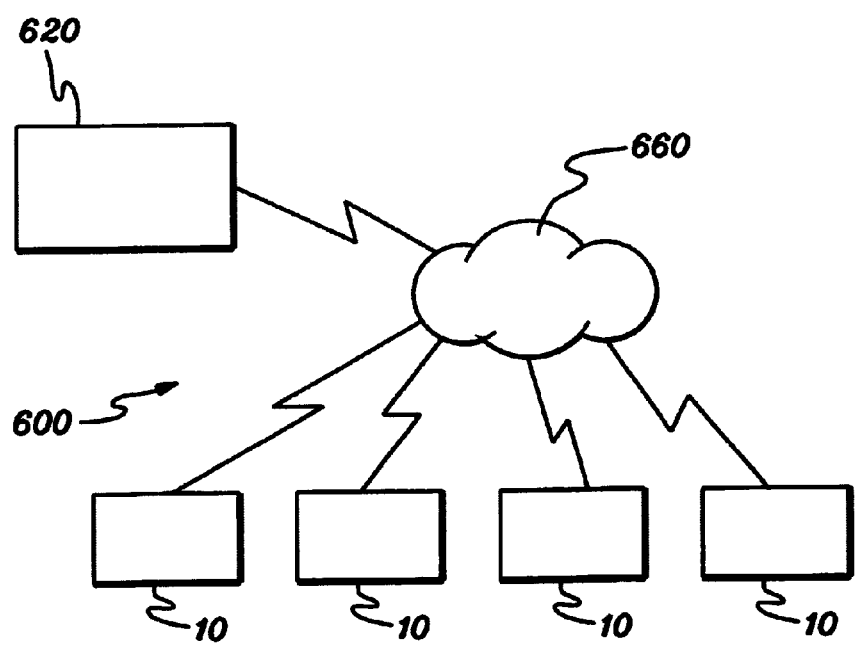
FIG. 6 is a block diagram of a plurality of grinder pump sewage systems connected to a central computing unit via a global communications network.

FIG. 6 is a schematic illustration of another embodiment of a networked monitoring system 600 which may be maintained by or on behalf of a service provider such as a local sewage department for automatically or manually monitoring a plurality of grinder pump systems at a central location. Networked monitoring system 600 includes, for instance, at least one central computing unit 620 coupled to at least one grinder pump system 10 via a global communications network 660 such as the Internet.

Central computing units 520 and 620 include, for example, one or more central processing units, memory and one or more input/output devices, as is well known in the art. The central computing unit may be based, for instance, on a Sun workstation running a Unix operating system, or a personal computer running a Microsoft WINDOWS operating system. The central computing unit desirably includes or has access to memory or data storage units, e.g., hard drive(s), compact disk(s), tape drive(s), etc., for storing various data which are accessed and used in monitoring one or more grinder pump systems.

Communications network 660 may comprise a local area network or a global communications network such as the Internet which comprises a vast number of computers and computer networks that are interconnected through communication links. The interconnected computers exchange information using various services, such as electronic mail, and the World Wide Web ("WWW"). The WWW service allows computing unit 620 (i.e., Web server or Web site) to receive information or a web page from grinder pump system 10. The central computing units 620 can then display the information on a monitor.

Each resource (e.g., computer or Web page) of the WWW is uniquely identifiable by a Uniform Resource Locator ("URL"). To access information or view a specific Web page, for example, one computing unit specifies the URL for a second computing unit in a request (e.g., a HyperText Transfer Protocol ("HTTP") request). Each grinder pump station may be provided with a uniquely identifiable Uniform Resource Locator as well as central computing unit 620 can be provided with a uniquely identifiable Uniform Resource Locator. For example, a request may be made by central computing unit 620 to one of grinder pump systems 10. When grinder pump system receives the request, it sends information on the operation of the grinder pump system to central computing unit 620. When central computing unit 620 receives the information, it typically displays the information in a Web page using a browser. A browser is a special-purpose application program that effects the requesting of Web pages and the displaying of Web pages. Central computing unit 620 may typically uses a browser such as Microsoft INTERNET EXPLORER or Netscape NAVIGATOR. Alternatively, the grinder pump sewage systems may be programmed to initiate contact with the central computing unit of a periodic basis such as every week or month. Contact can also be initiated immediately upon detection that a predicted problem will occur or if a failure has occurred.

More particularly, web pages are typically defined using HyperText Markup Language ("HTML"). HTML provides a standard set of tags that define how a Web page is to be displayed. When a field engineer, service personnel or central computing unit indicates to the browser to display a Web page, the browser sends a request to grinder pump sewage system to transfer to central computing unit 620 a HTML document that defines the Web page. When the requested HTML document is received by central computing unit 620, the browser displays the Web page as defined by the HTML document. The HTML document contains various tags that control the displaying of text, graphics, controls, and other features.

The above-described computing environments and/or computing units are only offered as examples. The present invention can be incorporated and used with many types of computing units, computers, processors, nodes, systems, workstations and/or environments without departing from the spirit of the present invention. For example, the information from the alarm panel need not be displayed in a Web page but instead printed out or otherwise used to alert service personnel that there is a problem.

Figure 7:
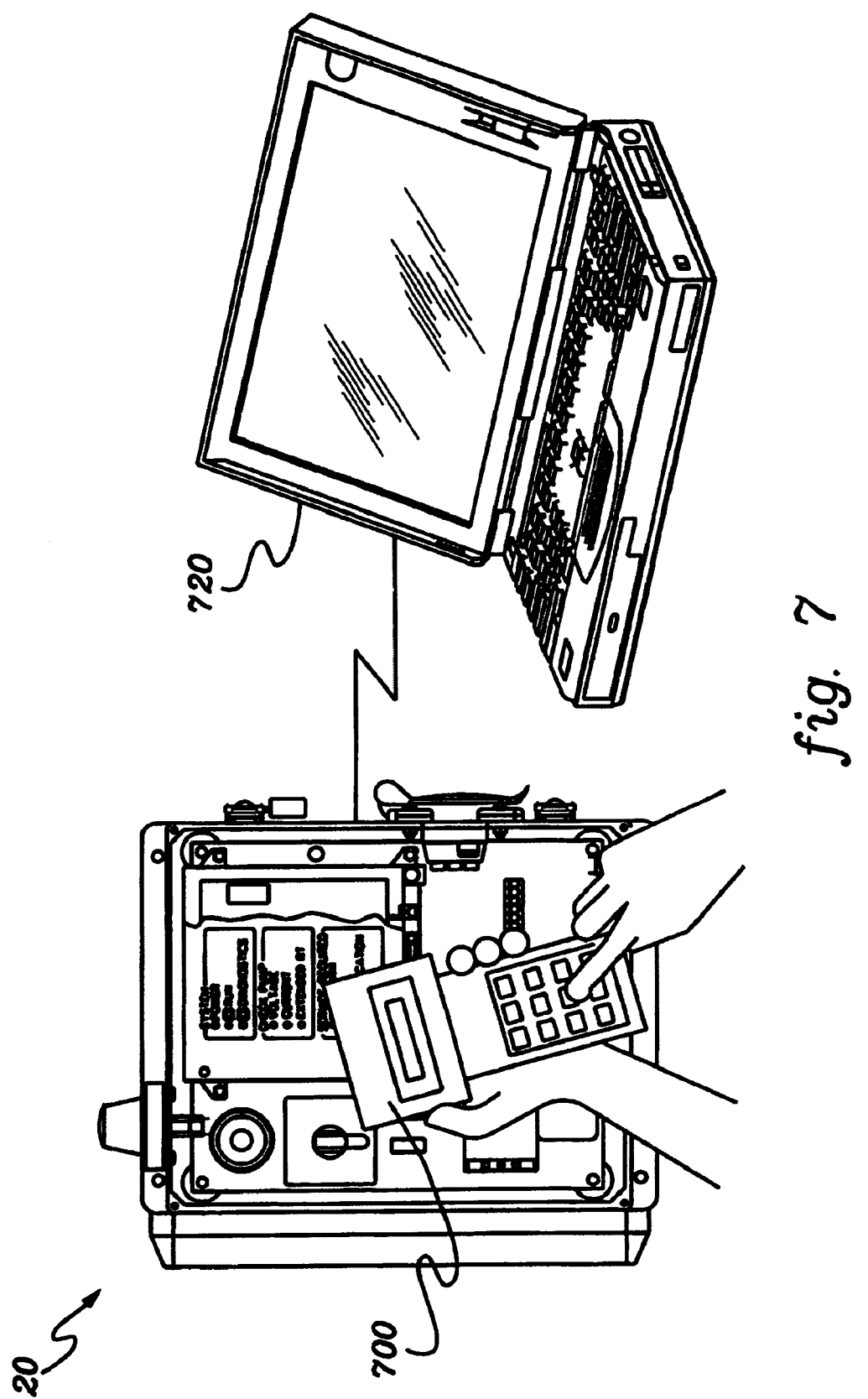
FIG. 7 is an elevational view of the alarm panel of FIG. 2 connected to a hand-held programmer and to a laptop computer.

As shown in FIG. 7, a hand-held programmer 700 or a laptop computer 720 may be used to set-up various settings of alarm panel 20 as well as allow on site monitoring. For example, the hand-held programmer and laptop may allow for setting the local time, programming the telephone number of the central computer unit, programming the identification name of number of the grinder pump system location, reviewing, modifying, downloading and displaying operating settings and status of the grinder pump settings, and/or testing of the modem.

Figure 9:
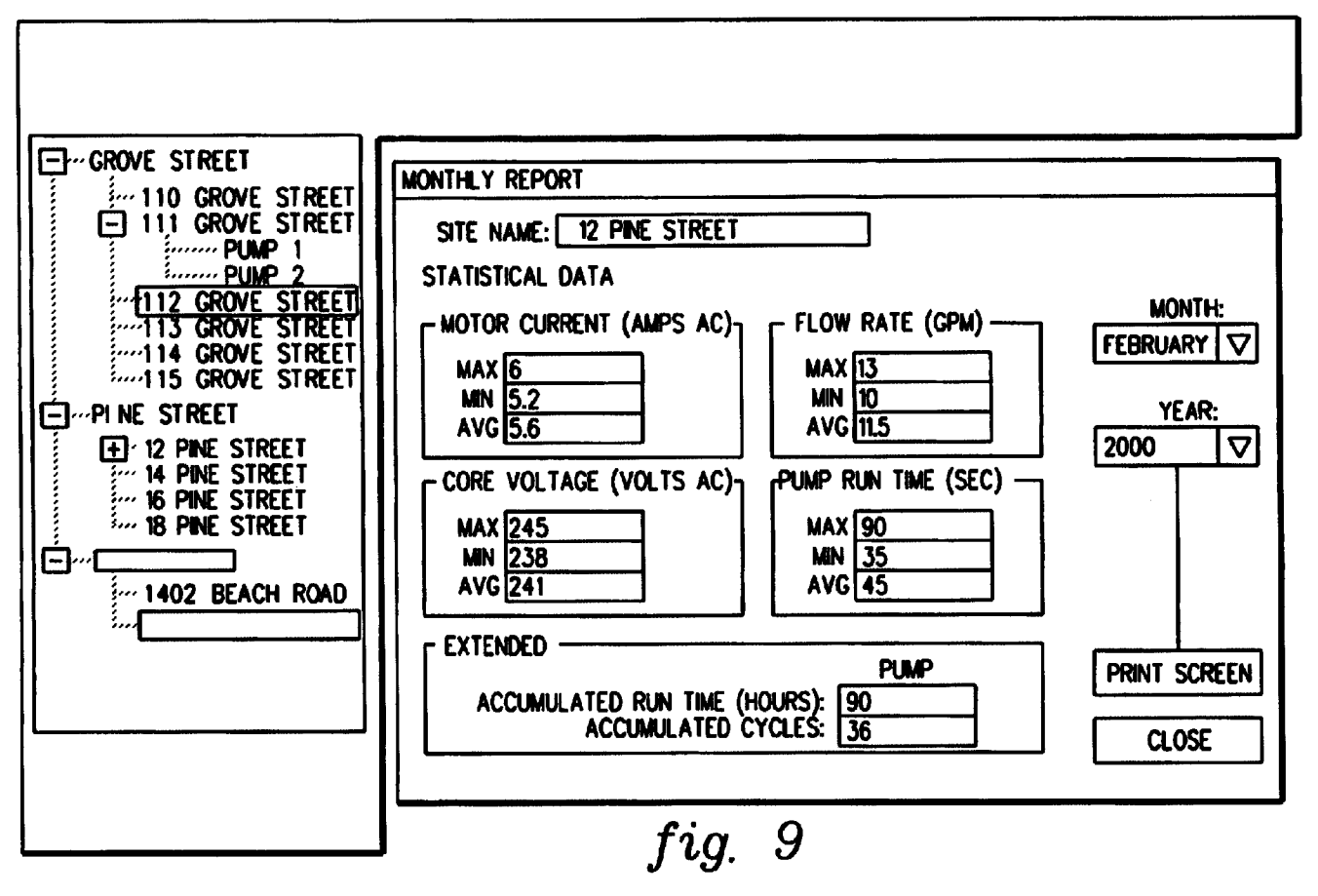

FIGS. 8 and 9 are screen displays, for example, on a computer monitor, such as the lap top screen or a computer monitor of the central computing unit at the central site.

Another aspect of the present invention is directed to a communication technique for transmission of data over a high voltage AC line, for example, the measurement of the water level in the grinder pump to the alarm panel. Typically, the grinder pump is desirably powered by a high voltage line, e.g., 240 VAC line. Also typically, the high voltage line runs from the alarm panel to the grinder pump. Electrically transmitting the measurement of the water level to the alarm panel over a line, which runs along side the high voltage line, requires that the line be shielded.

Figure 10:
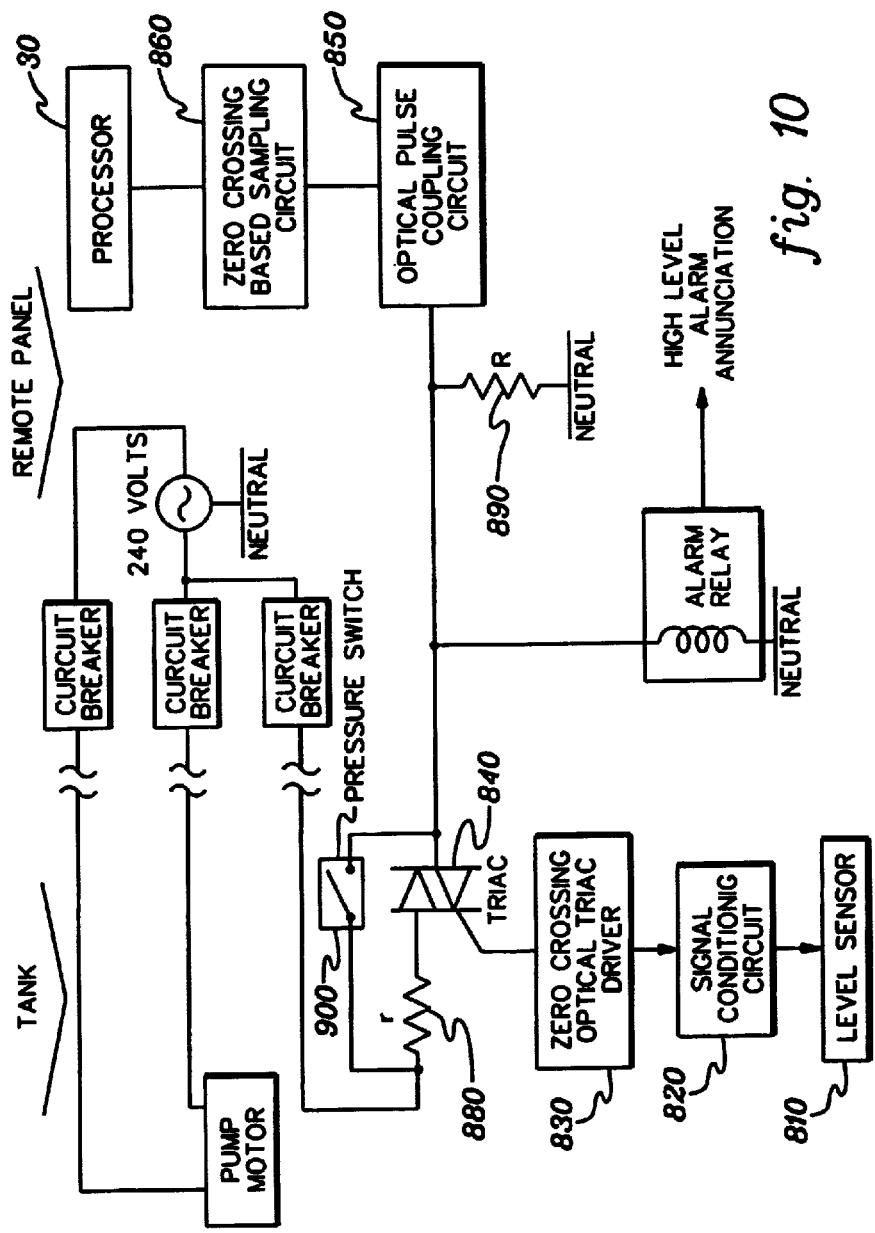
FIG. 10 is a block diagram of a system for transferring data regarding the water level of the grinder pump to the alarm panel over a high voltage line.

To avoid the expense of shielding, the communication technique includes using the high voltage line to the grinder pump or a separate high voltage line to transmit the measurement of the water level to the alarm panel as generally illustrated in FIG. 10.

Generally, a level sensor 810 is provided for providing a continuous voltage reading corresponding to the water level in the grinder pump, e.g., voltage being proportional to water level. Electronic circuitry at the grinder pump is provided to generate a series of pulses corresponding to the continuous voltage reading in the high voltage alternating current line (60 Hz, 240 VAC), e.g., modulate the amplitude to provide only a series of positive half sine wave pulses wherein 10 pulses equals one-inch of water in the grinder pump. The series of pulses in the high voltage line are detected at the alarm panel. At the alarm panel electronic circuitry is provided to determine the water level in the grinder pump based on the series of pulses.

With reference more particularly to FIG. 10, within the tank the analog voltage output of level sensor 810 is conditioned by the signal conditioning circuit 820 to gate a zero crossing optical triac driver 830 in such a manner as to cause a triac 840 to transmit N (60 Hz) rectified half cycle alternations of the power line to the remote alarm panel, where N can range from 0 to some maximum count and is equal, in tenths of an inch, to the height of the sewage within the tank. The alternations are synchronized to the zero crossings and the maximum N is transmitted across a time interval of (maximum N/120) seconds. An optical pulse coupling circuit 850 receives the N positive alternations and, in conjunctions with a zero crossing based sampling circuit 860, permits processor 30 to recover the height information.

Despite the fact that the height signal is close coupled to other conductors carrying high voltage (240 VAC RMS) errors from coupled noise are substantially eliminated because a) the information, itself, is transmitted at high voltage levels into a receiver which has moderate input impedance, b) detection of the alternations is referenced to the zero crossings of the power line which constitutes an error free timing reference at the remote alarm panel, and c) the operation of the zero crossing based sampling circuit and processor is such as to enable five signal level samples, distributed across the reference zero crossings, to be taken. Majority logic then decides the sense and, therefore, the value of the bit corresponding to the time slot of an alternation.

Figure 11:
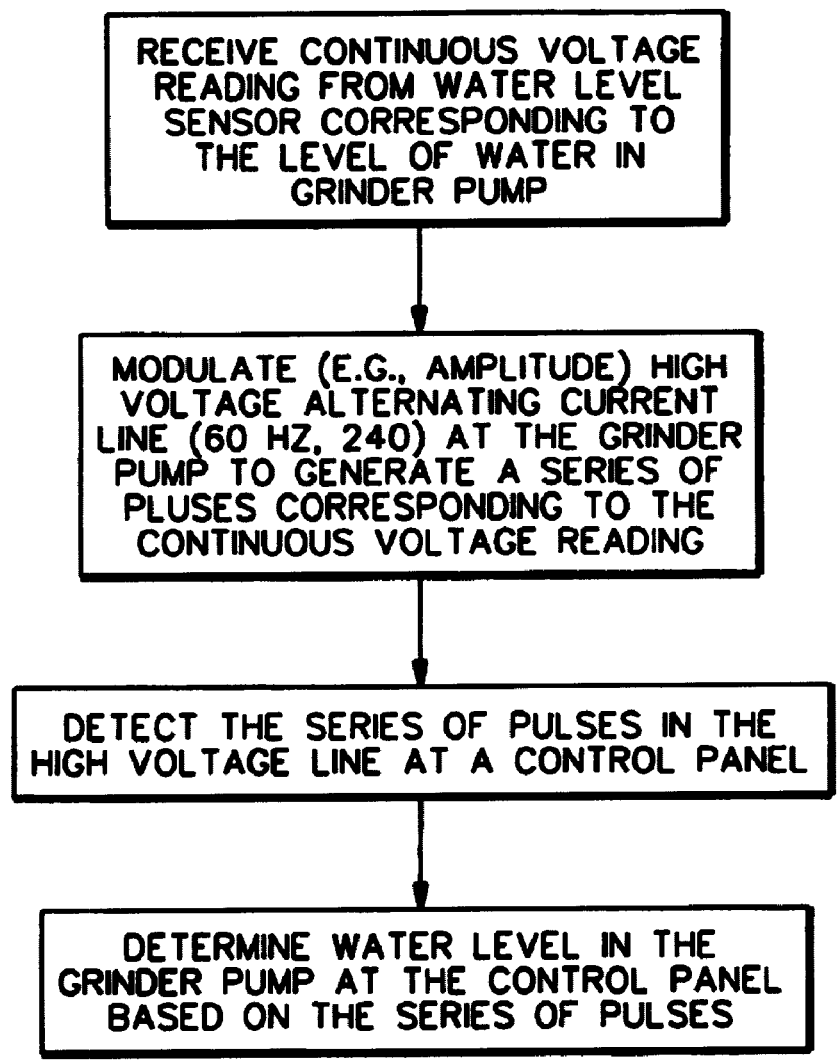
FIG. 11 is a flowchart of the method for transferring data regarding the water level of the grinder pump to the alarm panel over a high voltage line using the system shown in FIG. 10.

Resistors 880 and 890 permit a point sewage level pressure switch 900, placed across triac 840 and resistor 880 to provide a failsafe signal to the remote alarm panel should the continuous level sensor 810 fail. In normal operation, the resistor form a divider which keeps the signal voltage high enough to drive the optical pulse coupling circuit but not enough to energize the coil of the alarm relay. Should the level sensor 810 fail and the pressure switch 900 close, full voltage is applied to the alarm relay and high level alarm is annunciated. A flowchart illustrating the steps of this technique is shown in FIG. 11.

From the present description, it will be appreciated by those skilled in the art that other measurements of the operating parameters may be transmitted over the high voltage line from the grinder pump to the alarm panel in a similar manner. Such a technique reduces the need to shield a line for transmitting information from the grinder pump to the alarm panel.

In still another aspect of the present invention, the alarm panel and power loss high level module may be operably connected to an indoor wastewater processing systems such as the indoor wastewater processing systems described in the assignee's earlier filed patent application, U.S. patent application Ser. No. 09/454,543, filed Dec. 7, 1999 and entitled "Indoor Wastewater Disposal System and Tank Therefore." The entire subject matter of this application is hereby incorporated herein by reference. In addition, the alarm panel may be a control panel in which is also provided components for starting and operating the grinder pump.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

The invention claimed is:

1. A method for remotely monitoring for repair a plurality of grinder pump stations at a plurality of different first locations, the method comprising:
   obtaining data regarding the plurality of grinder pump stations at the first locations;
   transferring the data from the first locations via a communications network to a central computing unit at a second location different from the first locations; and
   at least one of a) wherein the data comprises data regarding maintenance warnings predicting failure of at least one of the plurality of grinder pump stations prior to failure, and b) wherein the data comprises data regarding the operation of the plurality of grinder pump stations and further comprising determining, at the central computing unit maintenance warnings predicting failure of at least one of the plurality of grinder pump stations prior to failure.

2. The method of claim 1 wherein the transferring comprises accessing the data at the first locations using the central computing unit.

3. The method of claim 1 wherein the transferring comprises automatically transmitting the data from the first locations via the communications network to the central computing unit.

4. The method of claim 1 wherein the communications network comprises a telephone line and further comprising allowing a homeowner use a telephone by overriding the transfer of data over the telephone line to the central computing unit.

5. The method of claim 1 further comprising comparing an operating parameter of the plurality of grinder pump stations over time to determine the maintenance warnings predicting failure of the at least one of the plurality of grinder pump stations prior to failure.

6. The method of claim 1 further comprising comparing an operating parameter of the plurality of grinder pump stations to a predetermined criteria to determine the maintenance warnings predicting failure of the at least one of the plurality of grinder pump stations prior to failure.

7. The method of claim 1 further comprising repairing the at least one of the plurality of grinder pump stations in response to the maintenance warnings predicting failure of the at least one of the plurality of grinder pump stations prior to failure.

8. The method of claim 1 wherein the data comprises data regarding the grinder pump.

9. The method of claim 1 wherein the data comprises the data regarding maintenance warnings predicting failure of the at least one of the plurality of grinder pump stations prior to failure.

10. The method of claim 1 wherein the data comprises the data regarding the operation of the plurality of grinder pump stations, and the determining, at the central computing unit maintenance warnings predicting failure of the at least one of the plurality of grinder pump stations prior to failure.

11. The method of claim 1 wherein the data comprises the data regarding maintenance warnings predicting failure of the at least one of the plurality of grinder pump stations prior to failure, and the data regarding the operation of the plurality of grinder pump stations and the determining, at the central computing unit maintenance warnings predicting failure of at least one of the plurality of grinder pump stations prior to failure.

12. The method of claim 1 wherein the obtaining data comprises:
   modulating a voltage of an alternating current line at a first position to generate a series of pulses corresponding to the data;
   detecting the series of pulses in the high voltage line at a second position different from the first position; and
   determining the data at the second position based on the series of pulses.

13. The method of claim 12 wherein the modulating comprises amplitude modulation.

14. The method of claim 12 wherein the receiving the data at the first position comprises receiving data at a grinder pump, and the determining the data at the second position comprises determining the data at an alarm panel.

* * * * *